United States Patent [19]
Wakeman

[11] 3,851,353
[45] Dec. 3, 1974

[54] PLIABLE TAPE STRUCTURES

[76] Inventor: Alfred W. Wakeman, Madison Rd., Durham, Conn. 06422

[22] Filed: July 16, 1973

[21] Appl. No.: 379,265

Related U.S. Application Data

[60] Division of Ser. No. 159,796, July 6, 1971, Pat. No. 3,751,760, which is a continuation-in-part of Ser. No. 859,619, Sept. 22, 1969, abandoned.

[52] U.S. Cl.................................. 16/150, 161/125
[51] Int. Cl................................................ E05d 7/00
[58] Field of Search ......... 16/150; 281/37.5, 21, 22, 281/40; 220/32, 30; 248/205 A

[56] References Cited
UNITED STATES PATENTS

| | | | |
|---|---|---|---|
| 3,279,473 | 10/1966 | Toman | 16/150 |
| 3,442,415 | 5/1969 | Glass | 16/150 |

*Primary Examiner*—Paul R. Gilliam
*Assistant Examiner*—Doris Troutman
*Attorney, Agent, or Firm*—Steward & Steward

[57] ABSTRACT

A flexible longitudinally continuous tape construction is disclosed for use in joining mating edges of juxtaposed members, the tape having an X-like configuration transversely of its length to provide paired legs adapted to receive and be secured to the edges of members to be joined. The tape is capable of serving as a pliable hinge to permit articulation of the joined members about an axis which may or may not be rectilinear; or it may also serve simply as a binding for joining members intended to be fixed relative to each other. The tape construction combines longitudinally continuous strips of sheet plastic, paper or cloth, at least some of which are formed to provide tabs or fingers projecting integrally from continuous marginal portions. The tabs of each strip are intermeshed and secured to an opposite strip to form the X-like configuration.

7 Claims, 8 Drawing Figures

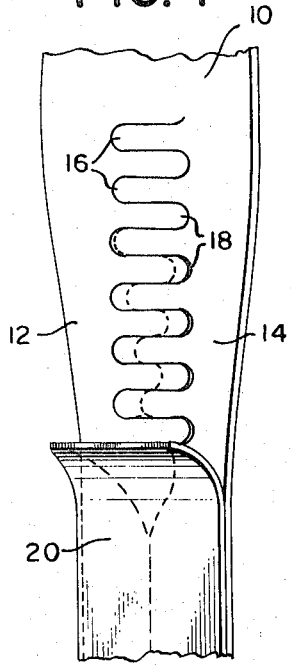
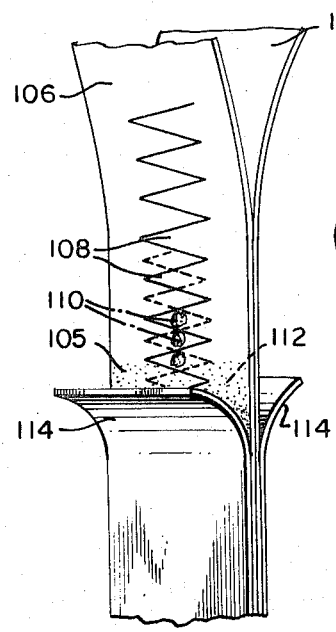
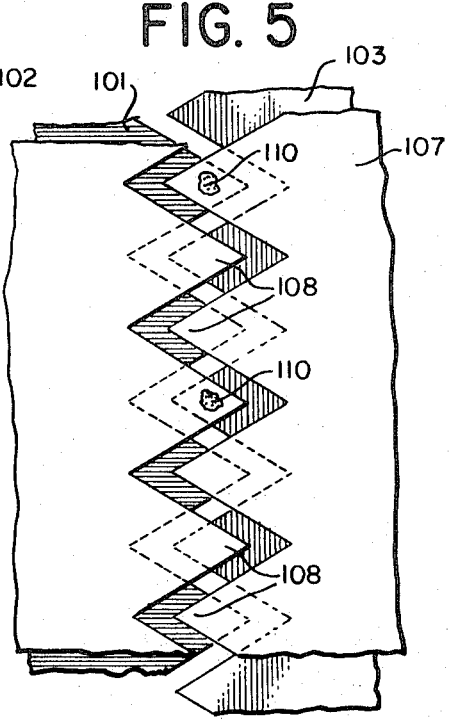
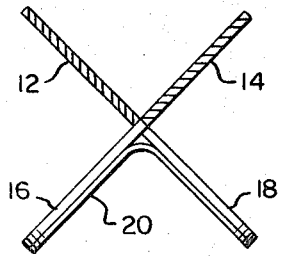
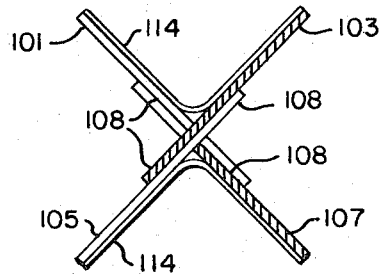
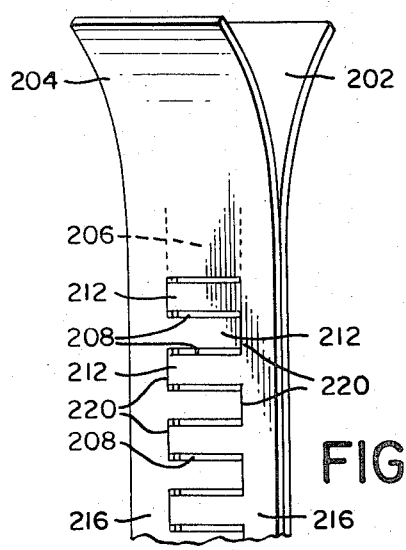
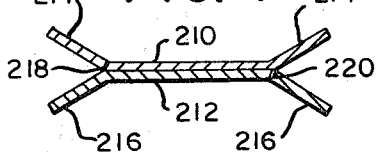
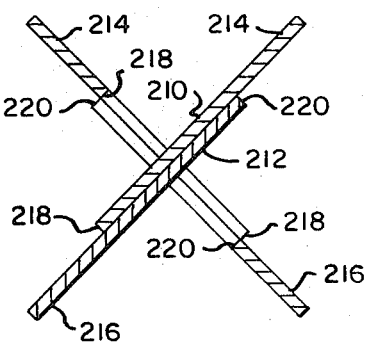

3,851,353

PLIABLE TAPE STRUCTURES

CROSS REFERENCE TO RELATED APPLICATIONS

This application is a division of my copending prior application Ser. No. 159,796, filed July 6, 1971, now U.S. Pat. No. 3751760, which was a continuation-in-part of application Ser. No. 859,619, filed Sept. 22, 1969, now abandoned. This case is also related to a copending divisional application, Ser. No. 379,264, filed on even date herewith.

FIELD OF THE INVENTION

This invention pertains to continuous length, pliable tape structures useful in joining mating edges of adjacent members for making rigid or hinged connection between such members.

PRIOR ART BACKGROUND

The limiting strength of conventional hinged or jointed structures utilizing sheet or panel members to form the structure is the ability of such members to carry localized stresses at points of attachment. There has accordingly existed for some time a need for better means of joining the edges of materials having relatively low resistance to localized loading stresses, such as that imposed by rivets, screws, spot welding and the like. Sheet or panel materials which give rise to the problem include formed plastic sheet, foamed core/stressed skin laminates, corrugated board, chipboard, felt laminates and similar light weight, low cost but easily rupturable stock commonly used in fabricating containers or other vessels, display structures, protective pads, folio covers, etc.

Various tape constructions for joining mating edges of such materials have been advanced heretofore. A common arrangement is illustrated in U.S. Pat. Nos. 589,504, 1,260,197, 1,833,469 and 3,035,752 where the junction is formed by fabric or paper strips or tabs which are simply glued to the faces of the members to be joined. One particular difficulty with these arrangements is their poor resistance to peeling of the tabs from the faces of the joined members when forces are applied tending to move the members bodily relative to each other. Another form is illustrated in U.S. Pat. Nos. Re 18,204, 1,988,036, 3,025,926, and 3,442,415. This form of joint-forming tape is characterized generally by the employment of two coextending tapes which are stitched together along their centerlines to form an X-like configuration in cross-section. The legs of the X are then glued or otherwise secured to the margins of the members to be joined. This represents an improvement over flat tape but the stitching, falling as it must at the axis of the hinge, weakens the structure at its most critical location.

Still another approach used for hingedly joining members is represented by the constructions shown in U.S. Pat. Nos. 46,071, 570,365 and 2,219,524. The arrangements there shown are not longitudinally continuous of the joined edges, so that a plurality of separate hinges must be used; and their attachment to the members to be joined presents problems. Molded plastic hinges of the type illustrated in U.S. Pat. Nos. 3,202,310 and 3,301,430 are designed to provide a continuous joint along the mating edges, but here again a problem is encountered in providing suitable means for securing such joint-forming constructions to the panel members.

SUMMARY OF THE INVENTION

The present invention provides a pliable tape structure which can be manufactured in continuous lengths and easily cut to any desired length for application to the members to be joined, much the same as ordinary pressure-sensitive tape is applied to a surface. The invention utilizes an inherent property possessed by a number of different inexpensive sheet materials, namely tensile strength, to provide hinge or joint-forming tape which, when applied to members to be joined, has great strength in itself and, in addition, largely eliminates localized stress points in the resulting structure. By reason of the tape configuration, the entire attachment area (glue or other bonding agent) is placed in shear only, distributing the load uniformly throughout the joint, as well as reducing peel forces tending to separate the tape from the members occasioned for example by forces tending to shift the members bodily relative to each other. In this way, advantage can be taken, in the selection of basic structural members, of materials of low cost but stress-oriented nature, such as paperboard, expanded or foamed plastic, etc., without the need and attendant expense of special reinforcement or auxiliary construction at the point of attachment. The invention thus makes possible better application of maximum material properties to achieve great strength-to-weight ratios in joined structures.

Other objectives include greater ease of application of the tape to members to be joined, and provision for specialized engineering applications, such as that involved in rolling hinges or in hingedly joining members whose mating edges are curved.

Use of the novel tapes for purposes other than hinging applications is of advantage where members to be secured together are subjected to loading or other forces tending to shift one member bodily relative to the other. The invention enables loadbearing structures such as display stands, mock-ups of prototype equipment, cartons, or containers of various configurations and the like to be made of relatively low unit strength (easily rupturable) sheet stock. In joining members or sections of these devices with tape of the design herein disclosed, the inadequacy in peel strength of conventional pressure-sensitive adhesive or mending tape is also largely overcome.

Several forms of related pliable tape structures are disclosed, and some of these are claimed, in my prior pending application Ser. No. 159,796 mentioned above. This application is directed to variant forms of tape not claimed in that patent application. As in the prior case, the tape structures of this invention are comprised generally of two essential components. One component is comprised of sets of pliable tabs or fingers disposed to run transversely of the joint to be formed, the tabs of one set crossing those of the other to form an X. The other component consists of strips of pliable sheet stock running longitudinally of the joint to be formed. In the tape configurations of this invention, the tabs are formed integrally with the longitudinal strips, wherein the latter form marginal portions from which the tabs extend generally transversely. Opposite sets of tabs are interleaved in X-like manner with their tips secured, as by gluing, to an opposite strip. Adhesive is applied to the confronting faces of legs in two transversely oriented quadrants of the X for bonding the tape to the margins of the members to be joined, whereby the margins of the members may be clamped between adjacent legs in quadrants of the X-like tape.

Typical embodiments of the novel tape are illustrated in the accompanying drawings and are described in detail hereinafter.

DESCRIPTION OF THE DRAWINGS

FIG. 1 is a perspective view illustrating the formation of a tape embodying the invention;

FIG. 2 is a cross-section of the finished portion of the tape seen in FIG. 1;

FIG. 3 is likewise a perspective view illustrating another form of tape embodying the invention, and a method of forming it;

FIG. 4 is a cross-section of the finished portion of the tape seen in FIG. 3;

FIG. 5 is an enlarged fragmentary view of the finished portion of the tape structure shown in FIG. 3;

FIG. 6 is a perspective view of another form of tape embodying the invention; and FIGS. 7 and 8 are cross-sectional views of the tape of FIG. 6 in partially completed and fully completed condition, respectively.

DESCRIPTION OF THE PREFERRED EMBODIMENTS

A simplified form of the novel tape structure is illustrated in FIGS. 1 and 2. As seen in FIG. 1, an initially imperforate strip or band 10 of sheet material is slit in generally sinusoidal manner along its longitudinal axis to produce complementary left and right marginal portions 12 and 14 having mutually projecting fingers 16 and 18, respectively. The sheet material employed for this may be paper, plastic or fabric, and may be either relatively non-stretchable or capable of providing some "give." After slitting, marginal portions 12, 14 are bodily shifted laterally towards one another to cause fingers 16, 18 to intermesh with and overlap the respectively opposite marginal portions. All of the fingers are disposed to overlap to the same tape face, that is, onto the upper face of the strip as seen in FIG. 1. An imperforate strip 20, whose width is equal to that resulting from intermeshing the marginal portions, is then applied over the lapped fingers and is bonded to the upper surfaces of those fingers, as by gluing, cementing, or by welding if the sheet stock is thermoplastic. Strip 20 is next creased longitudinally along the median defined by the roots of the intermeshed fingers. This creasing causes the two halves of strip 20 to form one set of adjacent legs of the resulting X-like structure, while marginal portions 12, 14 of the original strip 10 form the complementary set of adjacent legs, as seen in FIG. 2.

In applying this tape to the edges of panel members or the like to be joined, adhesive is applied either to opposite margins of both panels or, preferably, to adjacent leg faces in opposite quadrants of the tape structure. The tape may then be pressed lengthwise of the panel edges, sandwiching the edges between paired legs of the tape to cause the axis of the tape to extend along the junction of the panel members. As disclosed in the prior application Ser. No. 159,796 referred to above, it will usually be more convenient to provide pressure-sensitive adhesive on the legs of the tape as manufactured, and then to cover this temporarily with release strips to protect the adhesive until the tape is to be applied to the members to be joined. Since this has been fully disclosed and illustrated in the prior application referred to above, reference to that case is hereby made for further details of such modification.

A modified tape of similar construction is illustrated in FIGS. 3, 4 and 5. In this case two strips 102, 106 of suitable sheet stock are each slit in sinusoidal or sawtooth fashion along their respective longitudinal axes to produce left and right continuous marginal portions 101, 103 and 105, 107, respectively. Each marginal portion thus has inwardly directed, integrally connected tabs or teeth 108, which project generally transversely of the strip. Strips 102, 106 are shifted longitudinally after slitting so that the teeth are non-coincident, i.e., are out of phase so that the peaks of the teeth in one set of marginal portions 101, 103, overlap the peaks of the teeth in the other set of marginal portions 105, 107. Additionally, the marginal portions in each set are bodily separated slightly. See FIG. 5. This provides more freedom in the finished tape structure for hinging action and is accordingly desirable where the tape is to perform this function. The overlapped tooth peaks are glued or otherwise bonded together, as at 110, after which the several marginal portions may be swung out to form the legs of the X-like cross-section seen in FIG. 4. And again these legs may be coated with pressure-sensitive adhesive 112 for securing the tape to the edges of the members to be joined. Peel strips 114, one for each quadrant of a diagonally opposite pair, serve to protect the adhesive until the tape is applied.

A further variation in tape structure within the invention is seen in FIGS. 6, 7 and 8. In this case, two continuous strips 202, 204 of sheet material are joined along a central band 206, as by gluing or thermoplastic welding. A series of slots 208 is cut or punched in the strips, crosswise thereof and spaced longitudinally therealong, forming bridging tabs or cross fingers 210, 212. Slots 208 terminate short of the edges of the strips, leaving continuous marginal portions 214, 216 along the opposite edges of strips 202, 204, respectively. Strips 202, 204 are also slit longitudinally, individually as at 218, 220, intermediate paired slots 208 at alternately opposite ends of those slots. The slitting of strip 202 is arranged in longitudinally alternating fashion with that of the complementary strip 204, producing a square wave configuration. Thus a bridging tab 212 of upper strip 204, as seen in FIG. 6, for example, is joined to its marginal portion 216, whereas the corresponding underlying tab 212 of complementary strip 202 is joined to its marginal portion 214.

The slotting and slitting operations discussed above can be performed on the individual strips after to gluing them together, in which event of course care must be taken to ensure that the slitting of the strips to provide longitudinal cuts 218, 220, does not penetrate through more than the single strip thickness at each location. Alternatively, the strips can be slotted and slitted simultaneously, prior to gluing them together, in which case the two strips must then be indexed one step longitudinally relative to each other at the time they are glued together, in order to obtain the described alternation, front-to-back, of the slits 218, 220.

The method first described above lends itself to simple, inexpensive and extremely fast production of tape. Whichever method is used, there results a longidutinally X-like configuration, as shown in the cross-sectional view of FIG. 8, upon marginally separating the strips 202, 204. As in the previous embodiments, adhesive can be applied along confronting faces of marginal portions or legs of the X in opposite quadrants for securing the tape to members to be joined to it.

While not specifically shown in the drawings, individual peel strips for temporary protection of the adhesive on the tape legs may be substituted for the double width peel strips shown here. In such case, the peel strips also serve as an aid for proper application of the tape to the edges of the members to be joined, as more fully disclosed in the aforesaid prior application Ser. No. 859,619 to which reference is accordingly made.

The materials of choice for producing tapes of this invention are polyester and polypropylene film. It will be apparent however that many other sheet materials can be employed.

What is claimed is:

1. A flexible tape for joining mating edges of adjacent members, said tape having an X-like configuration in cross-section and providing a longitudinally continuous structure adapted to extend along and be secured to the edges of members to be joined so that the axis of said X-like configuration coincides generally with the juncture formed by the members to be joined, said tape comprising confronting strips of sheet material having longitudinally continuous, freely separable marginal portions, at least two of said marginal portions having integrally formed bridging tabs spaced longitudinally along and extending transversely of said marginal portions in opposing relation, the tabs of each of said portions being intermeshed and secured to an opposite strip in alternating relation along the longitudinal axis of the resulting structure.

2. A flexible tape as defined in claim 1, wherein said bridging tabs are of sinusoidal form.

3. A flexible tape as defined in claim 1, wherein said bridging tabs are of sawtooth form.

4. A flexible tape as defined in claim 1, wherein said bridging tabs are of square wave form.

5. A flexible tape as defined in claim 1, wherein one of said confronting strips is imperforate and said bridging tabs are secured in alternating relation along the tape axis to opposite marginal portions of said imperforate strip.

6. A flexible tape as defined in claim 1, wherein said confronting strips are composed of two sets of longitudinally continuous marginal portions with each portion formed to provide integral bridging tabs which alternate with tabs of the complementary marginal portion in each set, said sets being identical but indexed longitudinally in assembled condition so that the tabs of each set are secured to oppositely extending tabs of the opposite set.

7. A flexible tape as defined in claim 1, wherein the sheet material of which it is formed is polyester or polypropylene film.

* * * * *